(12) United States Patent
Lee et al.

(10) Patent No.: US 9,447,738 B2
(45) Date of Patent: Sep. 20, 2016

(54) METHOD FOR CONTROLLING VARIABLE VALVE LIFT APPARATUS AND VARIABLE VALVE LIFT SYSTEM

(71) Applicant: Hyundai Motor Company, Seoul (KR)

(72) Inventors: Jang Su Lee, Yongin-si (KR); Jun Yu, Suwon-si (KR); Keun Sang Kim, Anyang-si (KR); Hyeungwoo Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 14/144,357

(22) Filed: Dec. 30, 2013

(65) Prior Publication Data

US 2015/0114375 A1    Apr. 30, 2015

(30) Foreign Application Priority Data

Oct. 24, 2013    (KR) ........................ 10-2013-0127325

(51) Int. Cl.
*F02D 41/30*    (2006.01)
*F02D 13/02*    (2006.01)
*F02D 41/00*    (2006.01)
*F01L 1/34*    (2006.01)

(52) U.S. Cl.
CPC ............ *F02D 13/0207* (2013.01); *F01L 1/34* (2013.01); *F02D 41/0002* (2013.01); *F02D 41/30* (2013.01); *F02D 2041/001* (2013.01); *F02D 2200/023* (2013.01); *Y02T 10/18* (2013.01); *Y02T 10/42* (2013.01)

(58) Field of Classification Search
CPC ........... F02D 13/0207; F02D 13/0223; F02D 13/0226; F02D 41/0002; F02D 2041/001
See application file for complete search history.

(56) References Cited

U.S. PATENT DOCUMENTS

2007/0056537 A1* 3/2007 Morimasa .................. 123/90.15
2007/0283911 A1* 12/2007 Nakamura et al. ........ 123/90.16
2009/0064950 A1* 3/2009 Rayl .......................... 123/90.15

FOREIGN PATENT DOCUMENTS

| JP | 2004068809 A | * | 3/2004 | ............. F02D 13/02 |
| KR | 2003-0026729 A | | 4/2003 | |
| KR | 10-2005-0022381 A | | 3/2005 | |
| KR | 10-2012-0047695 A | | 5/2012 | |

* cited by examiner

*Primary Examiner* — Lindsay Low
*Assistant Examiner* — Kevin Lathers
(74) *Attorney, Agent, or Firm* — Morgan, Lewis & Bockius LLP

(57) ABSTRACT

A method for controlling a variable valve lift apparatus includes: measuring an operation mode switching condition; determining whether the variable valve lift apparatus is in a normal operation condition; controlling the operation of the variable valve lift apparatus depending on a predetermined normal valve lift switching map; determining whether the variable valve lift apparatus is in a mode switching delay or switching disable condition from a high lift mode to a low lift mode or whether the variable valve lift apparatus is in the mode switching delay or switching disable condition from the low lift mode to the high lift mode; controlling the operation of the variable valve lift apparatus depending on a predetermined low oil temperature valve lift switching map; and controlling the operation of the variable valve lift apparatus depending on a predetermined high oil temperature valve lift switching map.

7 Claims, 7 Drawing Sheets

METHOD FOR CONTROLLING VARIABLE VALVE LIFT APPARATUS AND VARIABLE VALVE LIFT SYSTEM

CROSS-REFERENCE TO RELATED APPLICATION

The present application claims priority of Korean Patent Application Number 10-2013-0127325 filed Oct. 24, 2013, the entire contents of which application is incorporated herein for all purposes by this reference.

BACKGROUND OF INVENTION

1. Field of Invention

The present invention relates to a method for controlling a variable valve lift apparatus and a variable valve lift system, and more particularly, to a method for controlling a variable valve lift apparatus depending on given conditions by determining whether the variable valve lift apparatus is in a normal operation state depending on the given conditions and a variable valve lift system.

2. Description of Related Art

An internal combustion engine combusts fuel and air supplied to a combustion chamber to generate power.

When sucking air, an intake value is operated by driving a camshaft and air is sucked in the combustion chamber while the intake valve is opened.

Further, an exhaust valve is operated by driving the camshaft and air is exhausted from the combustion chamber while the exhaust valve is opened.

However, the optimal operation of the intake valve/ exhaust valve varies depending on a rotating speed of an engine.

That is, an appropriate lift or a valve opening/closing time varies depending on the rotating speed of the engine.

Many researches to appropriately operate the valves depending on the rotating speed of the engine as described above have been conducted.

For example, research into a variable valve lift (VVL) apparatus which operates the valve as another lift depending on an engine RPM and a variable valve timing (VVT) apparatus which opens and closes the valve at an appropriate timing depending on the engine RPM has been conducted.

An oil control valve (OCV) which is used to operate the variable valve lift operation controls an operation of the variable valve lift apparatus by changing an oil passage. That is, the oil control valve (OCV) changes the oil passage to change an oil pressure transferred to the variable valve lift apparatus, thereby operating the variable valve lift apparatus.

However, in the case of the control by the oil pressure, the malfunction of the variable valve lift apparatus may occur depending on a climatic condition, such that an operation range of the variable valve lift apparatus may be reduced.

The reduction in the operation range of the variable valve lift apparatus may lead to the deterioration of engine performance and engine durability.

To solve the problems, an electric motor control scheme independent of the oil pressure may be used. However, the electric motor control scheme spends much cost and may increase power consumption to increase fuel consumption.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a method for controlling a variable valve lift apparatus depending on given conditions by determining whether the variable valve lift apparatus is in a normal operation state depending on the given conditions, and a variable valve lift system.

Various aspects of the present invention provide for a method for controlling a variable valve lift apparatus, including: measuring an operation mode switching condition of the variable valve lift apparatus; determining, by a controller, whether the variable valve lift apparatus is in a normal operation condition based on the measured operation mode switching condition; controlling, by the controller, the operation of the variable valve lift apparatus depending on a predetermined normal valve lift switching map if it is determined that the variable valve lift apparatus satisfies the normal operation condition; determining, by the controller, whether the variable valve lift apparatus is in a mode switching delay or switching disable condition from a high lift mode to a low lift mode or whether the variable valve lift apparatus is in the mode switching delay or switching disable condition from the low lift mode to the high lift mode, if it is determined that the variable valve lift apparatus does not satisfy the normal operation condition; controlling, by the controller, the operation of the variable valve lift apparatus depending on a predetermined low oil temperature valve lift switching map when the variable valve lift apparatus is in the mode switching delay or switching disable condition from the high lift mode to the low lift mode; and controlling, by the controller, the operation of the variable valve lift apparatus depending on a predetermined high oil temperature valve lift switching map when the variable valve lift apparatus is in the mode switching delay or switching disable condition from the low lift mode to the high lift mode.

The low oil temperature valve lift switching map may include a set first engine RPM which switches the variable valve lift apparatus from the high lift mode to the low lift mode depending on the measured operation mode switching condition.

The high oil temperature valve lift switching map may include a set second engine RPM larger than the first engine RPM which switches the variable valve lift apparatus from the low lift mode to the high lift mode depending on the measured operation mode switching condition.

The method for controlling a variable valve lift apparatus may further include: controlling, by the controller, an air content control valve which controls an air content introducing into the engine to increase the introducing air content, when the variable valve lift apparatus is in the mode switching delay or switching disable condition from the low lift mode to the high lift mode.

The method for controlling a variable valve lift apparatus may further include: controlling, by the controller, an injector to reduce an injected fuel amount, when the variable valve lift apparatus is in the mode switching delay or switching disable condition from the high lift mode to the low lift mode.

The operation mode switching condition may include a predetermined oil temperature condition and oil pressure condition.

The oil temperature may be expected by measuring the cooling water temperature.

The operation mode switching condition may further include at least any one of atmospheric temperature, atmospheric pressure, and atmospheric humidity.

Various aspects of the present invention provide for a variable valve lift system, including: an engine configured to include a variable valve lift apparatus, an air content control valve which controls an introducing air content, an engine RPM sensor, and an injector; an oil pressure sensor configured to measure an oil pressure to output a corresponding signal; a cooling water temperature sensor configured to measure a cooling water temperature to output a corresponding signal; a memory configured to store a normal valve lift switching map which switches an operation mode of the variable valve lift apparatus when the variable valve lift apparatus is in a normal operation condition, a low oil temperature valve lift switching map which switches the operation mode of the variable valve lift apparatus when the variable valve lift apparatus is in a mode switching delay or switching disable condition from the high lift mode to the low lift mode, and a high oil temperature valve lift switching map which switches the operation mode of the variable valve lift apparatus when the variable valve lift apparatus is in the mode switching delay or switching disable condition from the low lift mode to the high lift mode; and a controller configured to receive the corresponding signal from the oil pressure sensor, the cooling water temperature sensor, and the engine RPM sensor to determine the currently available valve lift switching map among the valve lift switching maps from the memory and control the operation of the variable valve lift apparatus depending on the determined corresponding valve lift switching map.

The controller may control the operation of the air content control valve to increase the air content introducing into the engine when the variable valve lift apparatus is controlled depending on the high oil temperature lift switching map.

The controller may control the operation of the injector to reduce the fuel amount injected to the engine when the variable valve lift apparatus is controlled depending on the low oil temperature lift switching map.

According to the method for controlling a variable valve lift apparatus and the variable valve lift system according to various embodiments of the present invention, it is possible to improve the operation limitation of the variable valve lift apparatus by controlling the variable valve lift apparatus depending on the given conditions by determining whether the variable valve lift apparatus is in a normal operation state depending on the given conditions.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, unless explicitly described to the contrary, the word "comprise" and variations such as "comprises" or "comprising", will be understood to imply the inclusion of stated elements but not the exclusion of any other elements.

Figure 1:
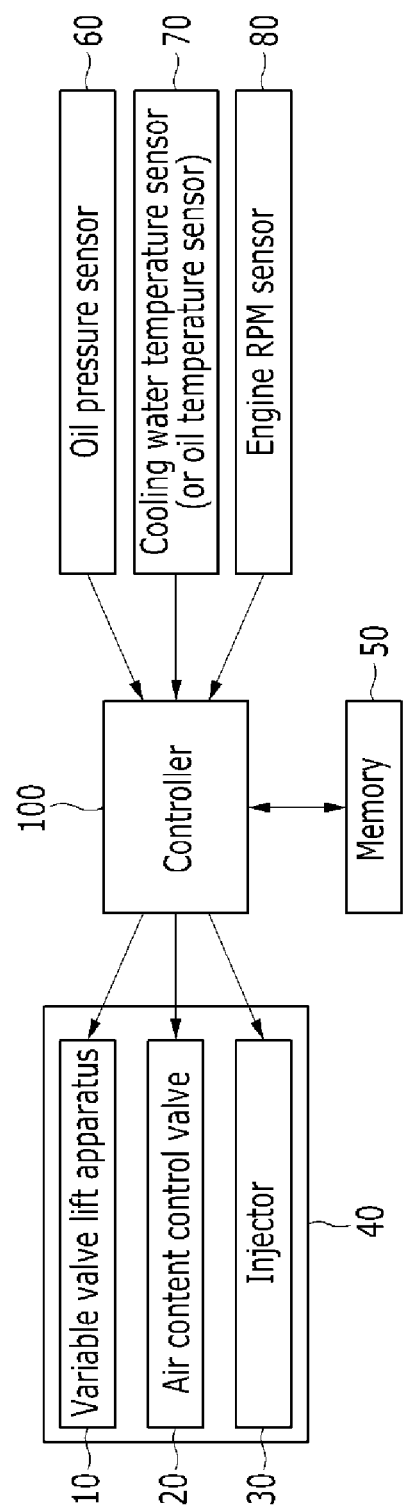
FIG. 1 is a block diagram of an exemplary variable valve lift system according to the present invention.

FIG. 1 is a block diagram of a variable valve lift system according to various embodiments of the present invention.

Referring to FIG. 1, the variable valve lift system according to various embodiments of the present invention includes an engine 40, an oil pressure sensor 60, a cooling water temperature sensor 70, a memory 50, and a controller 100.

The engine 40 may include a variable valve lift apparatus 10, an air content control valve 20 which controls an introducing air content, an engine RPM sensor 80, and an injector 40.

In the variable valve lift system according to various embodiments of the present invention, the air content control valve 20 may be a valve which directly controls a fresh air content introducing into the engine 40 and may also be an EGR valve which controls a ratio of the fresh air introducing into the engine 40 by controlling an amount of EGR gas.

The variable valve lift apparatus 10 is a general variable valve lift apparatus which implements a high lift mode and a low lift mode based on an oil pressure. That is, when a high pressure oil is supplied to the variable valve lift apparatus 10, the variable valve lift apparatus 10 is operated in the high lift mode and when a low pressure oil is supplied to the variable valve lift apparatus 10 and the oil supplied to the variable valve lift apparatus 10 is reliefed, the variable valve lift apparatus 10 is operated in the low lift mode.

The oil pressure sensor 60 measures the oil pressure, in particular, the oil pressure operating the variable valve lift apparatus 10 to output the corresponding signal.

The cooling water temperature sensor 70 measures a cooling water temperature to output the corresponding signal.

The memory 50 stores a normal valve lift switching map which switches an operation mode of the variable valve lift apparatus 10 when the variable valve lift apparatus 10 is in a normal operation condition, a low oil temperature valve lift switching map which switches the operation mode of the variable valve lift apparatus 10 when the variable valve lift apparatus 10 is in a mode switching delay or switching disable condition from the high lift mode to the low lift mode, and a high oil temperature valve lift switching map which switches the operation mode of the variable valve lift apparatus 10 when the variable valve lift apparatus 10 is in the mode switching delay or switching disable condition from the low lift mode to the high lift mode.

The controller 100 receives the corresponding signal from the oil pressure sensor 60, the cooling water temperature sensor 70, and the engine speed sensor 80 to determine the currently available valve lift switching map among the valve lift switching maps from the memory 50, and controls the operation of the variable valve lift apparatus 10 depending on the determined corresponding valve lift switching map.

Figure 2:
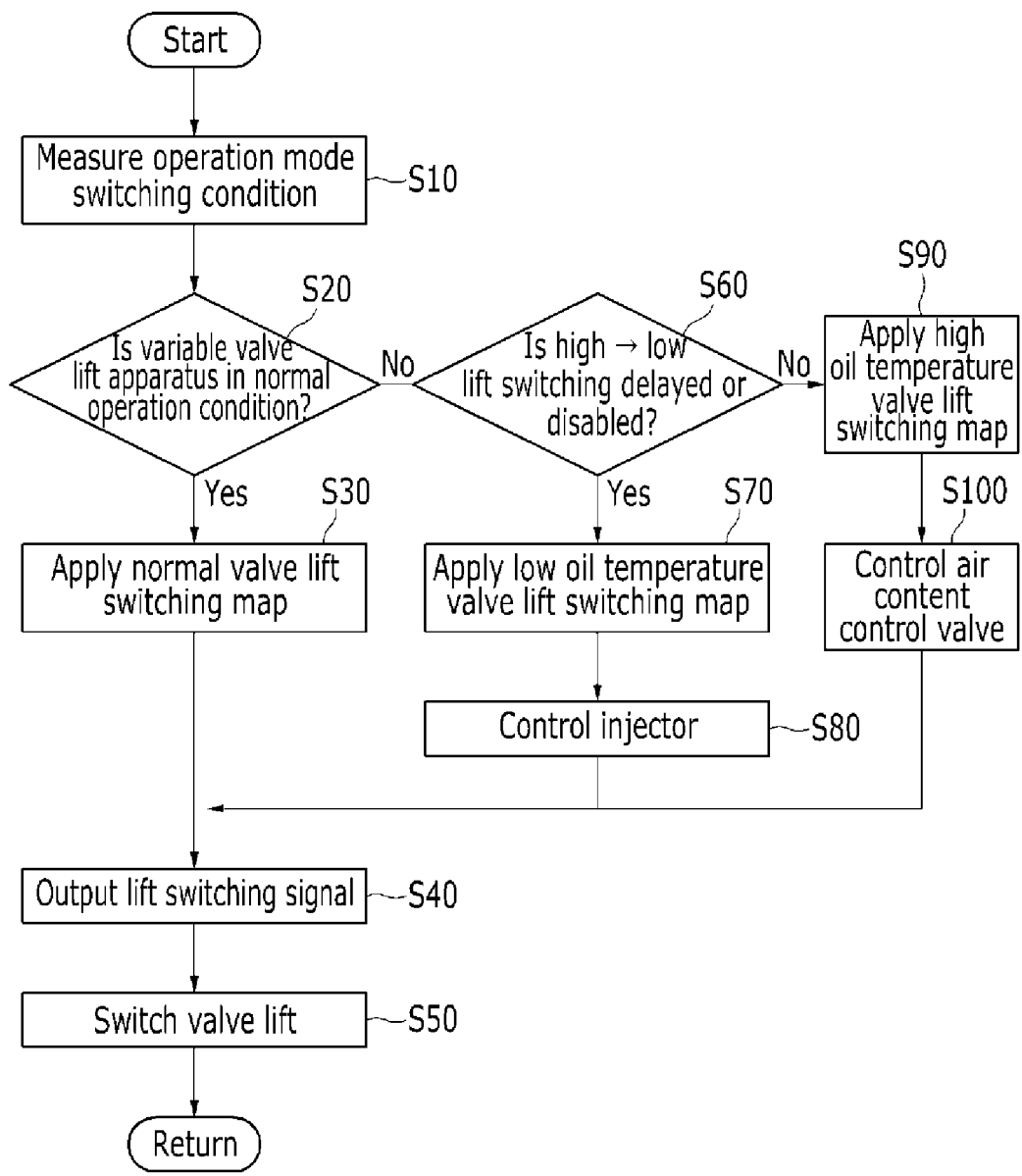
FIG. 2 is a flow chart of an exemplary method for controlling a variable valve lift system according to the present invention.

FIG. 2 is a flow chart of a method for controlling a variable valve lift system according to various embodiments of the present invention.

Referring to FIGS. 1 and 2, the method for controlling a variable valve lift apparatus according to various embodiments of the present invention includes: measuring an operation mode switching condition of the variable valve lift apparatus 10 (S10); determining whether the controller 100 is the normal operation condition of the variable valve lift apparatus 10 based on the measured operation mode switching condition (S20); controlling, by the controller 100, the operation of the variable valve lift apparatus 10 depending on the predetermined normal valve lift switching map if it is determined that the controller 100 satisfies the normal operation condition (S30); determining whether the variable valve lift apparatus 10 is in the mode switching delay or switching disable condition from the high lift mode to the low lift mode or determining whether the variable valve lift apparatus is in the mode switching delay or switching disable condition from the low lift mode to the high lift mode if it is determined that the controller 100 does not satisfy the normal operation condition (S60); controlling, by the controller 100, the operation of the variable valve lift apparatus 10 depending on the predetermined low oil temperature valve lift switching map when the variable valve lift apparatus 10 is in the mode switching delay or switching disable condition from the high lift mode to the low lift mode (S70); and controlling, by the controller 100, the operation of the variable valve lift apparatus 10 depending on the predetermined high oil temperature valve lift switching map when the variable valve lift apparatus 10 is in the mode switching delay or switching disable condition from the low lift mode to the high lift mode (S90).

After the step S30, the lift switching signal is output (S40) and the operation mode of the valve lift is switched (S50), depending on the normal valve lift switching map.

The operation mode switching condition may include a predetermined oil temperature condition and oil pressure condition.

The oil temperature may be expected by measuring the cooling water temperature.

That is, the oil temperature may directly be measured by using the oil temperature sensor 70 and may expect the oil temperature using the relationship between the cooling water temperature and the oil temperature by an experiment. A method for predicting the oil temperature using the cooling water temperature is apparent to a person having ordinary skill in the art, and therefore the detailed description thereof will be omitted.

In the step S20, the normal operation condition of the variable valve lift apparatus 10 may be a condition including the predetermined oil pressure and oil pressure set by the experiment at which the variable valve lift apparatus 10 may be normally operated.

The low oil temperature valve lift switching map may include a set first engine RPM which switches the variable valve lift apparatus 10 from a high lift mode to a low lift mode depending on the measured operation mode switching condition.

The high oil temperature valve lift switching map may include a set second engine RPM larger than the first engine RPM which switches the variable valve lift apparatus 10 from the high lift mode to the low lift mode depending on the measured operation mode switching condition.

In the step S60, the abnormal operation condition, the mode switching delay, or the switching disable condition, which is a condition including the oil pressure and oil temperature set by the experiment at which the variable valve lift apparatus 10 may not be normally operated, determines whether the variable valve lift apparatus 10 is in the state in which the variable valve lift apparatus 10 may not be normally switched from the high lift mode to the low lift mode or whether the variable valve lift apparatus 10 is in the state in which the variable valve lift apparatus 10 may not be normally switched from the low lift mode to the high lift mode.

The method for controlling a variable valve lift apparatus according to various embodiments of the present invention may further include controlling the introducing air content by controlling, by the controller 100, the operation of the air content control valve 20 when the variable valve lift apparatus 10 is in the mode switching delay or switching disable condition from the low lift mode to the high lift mode (S100). For example, the method copes with the switching delay or switching disabling of the lift mode by increasing the introducing air content.

The method for controlling a variable valve lift apparatus according to various embodiments of the present invention may further include reducing the injected fuel amount by controlling, by the controller 100, the injector 30 when the variable valve lift apparatus 10 is in the mode switching delay or switching disable condition from the high lift mode to the low lift mode (S80).

The operation mode switching condition may further include at least any one of atmospheric temperature, atmospheric pressure, and atmospheric humidity.

Figure 6:
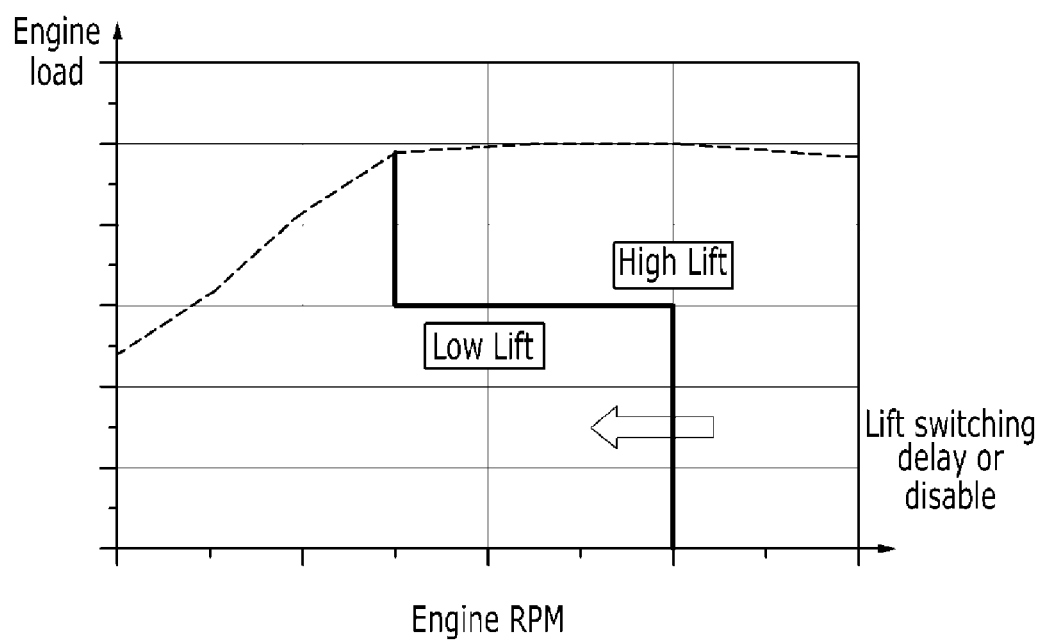
FIG. 6 and FIG. 7 are graphs describing abnormal behaviors of a general variable valve lift apparatus.
Figure 7:
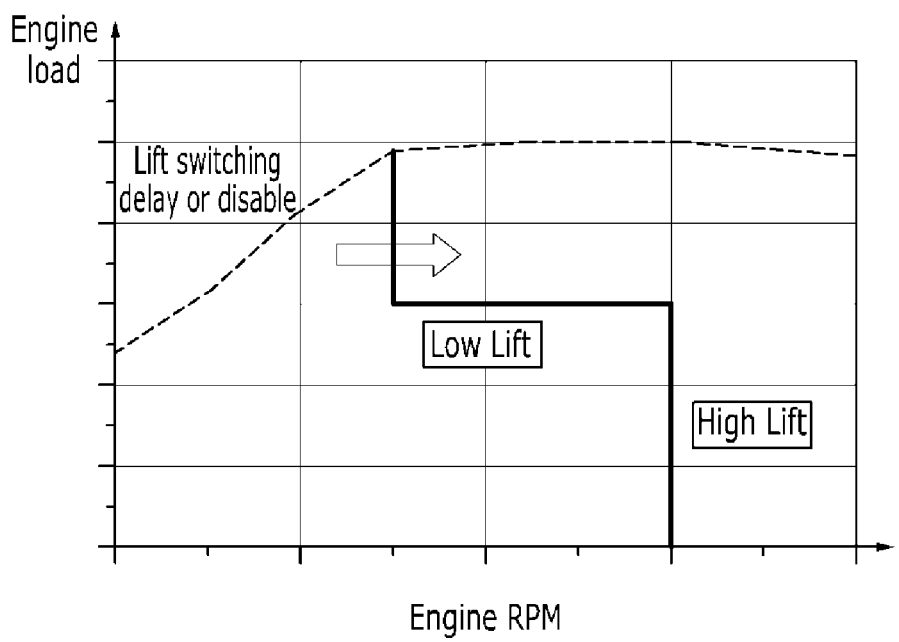

FIGS. 6 and 7 are graphs describing abnormal behaviors of a general variable valve lift apparatus.

When the oil temperature is a low temperature and the oil pressure is a high pressure, the graph illustrated in FIG. 6 illustrates that the switching from the high lift mode to the low lift mode of the variable valve lift apparatus is delayed.

For example, when the oil temperature is 10° C. or less and the oil pressure is 5 bar or more, the viscosity of oil is relatively increased and thus the dissolution of the oil supplied to the variable valve lift apparatus 10 is delayed, such that the switching from the high lift mode to the low lift mode of the variable valve lift apparatus may be in a condition in which the switching of the high lift mode of the variable valve lift apparatus into the low lift mode thereof is delayed or disabled and the incomplete combustion of fuel may occur.

When the oil temperature is a high temperature and the oil pressure is a low pressure, the graph illustrated in FIG. 7 illustrates that the switching from the low lift mode to the high lift mode of the variable valve lift apparatus is disabled.

For example, when the oil temperature is 120° C. or more and the oil pressure is 1 bar or less, the viscosity of oil is relatively low and thus the switching of the variable value lift apparatus from the low lift mode to the high lift mode may be in a condition in which the switching of the low lift mode of the variable valve lift apparatus to the high lift mode thereof Is delayed or disabled, such that the exhaust gas temperature may be excessively increased.

As such, in the case of the general variable valve lift apparatus, the malfunction of the variable valve lift apparatus may occur depending on the given conditions, such that the operation range of the variable valve lift apparatus may be reduced.

The reduction in the operation range of the variable valve lift apparatus may lead to the deterioration of engine performance and engine durability.

However, the method for controlling a variable valve lift apparatus according to various embodiments of the present invention may improve the operation limitation of the variable valve lift apparatus by changing the switching condition of the valve lift in the condition in which the abnormal behavior of the variable valve lift apparatus occurs.

Figure 3:
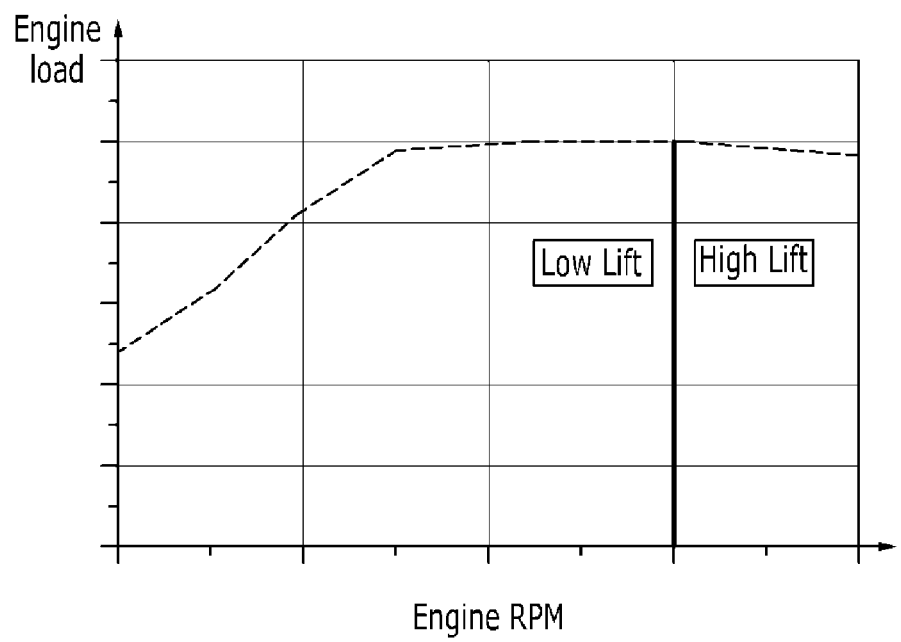
FIG. 3, FIG. 4 and FIG. 5 are graphs illustrating a valve lift switching map of an exemplary method for controlling a variable valve lift apparatus according to the present invention.
Figure 4:
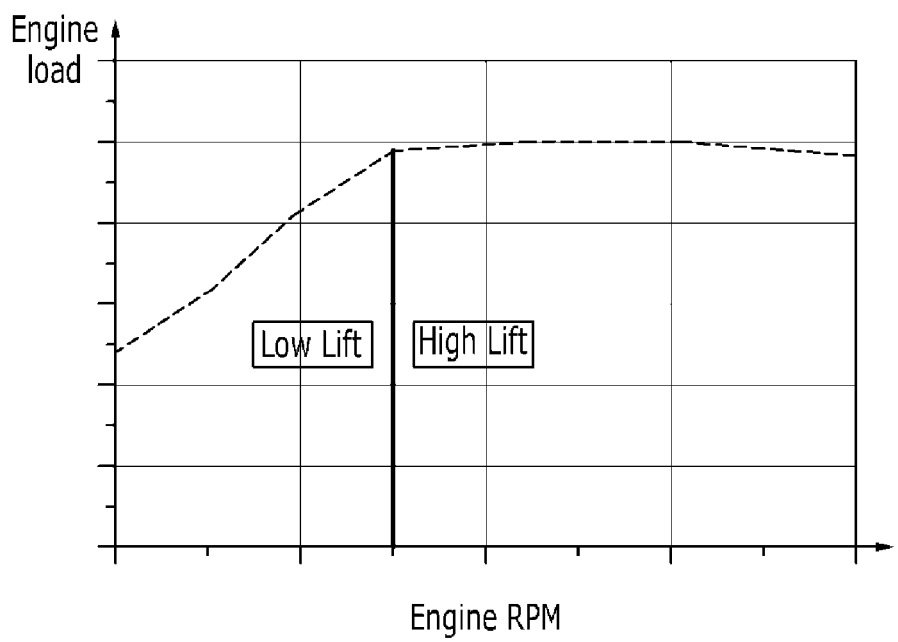
Figure 5:
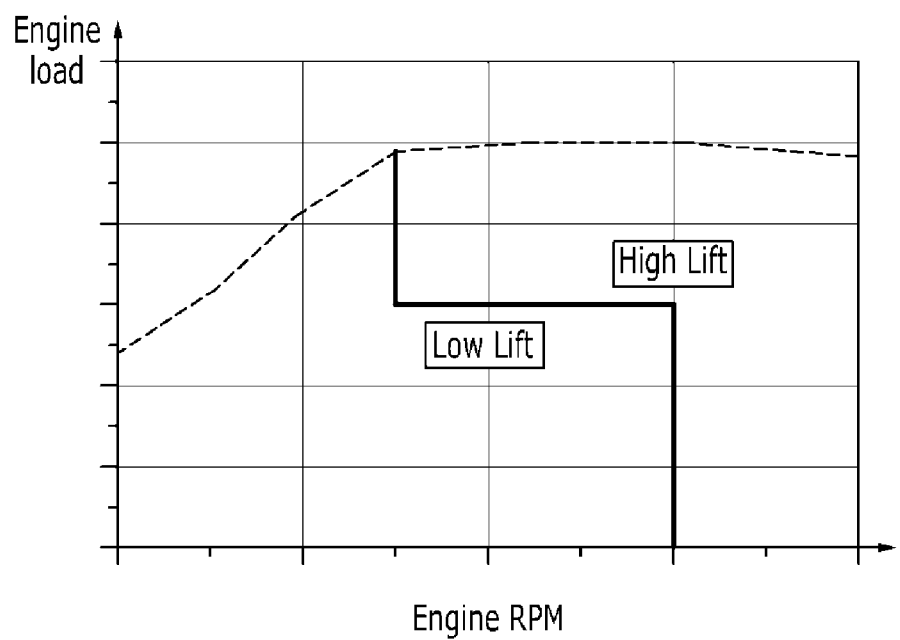

FIGS. 3 to 5 are graphs illustrating a valve lift switching map of the method for controlling a variable valve lift apparatus according to various embodiments of the present invention.

FIG. 5 is a graph illustrating the valve lift switching map according to the method for controlling a variable valve lift apparatus according to various embodiments of the present invention in the condition of the oil temperature and the oil pressure at which the variable valve lift apparatus may be normally operated.

As illustrated in FIG. 5, in the condition of the oil temperature and the oil pressure at which the variable valve lift apparatus may be normally operated, the switching map between the low lift mode and the high lift mode is set depending on an engine load and the engine RPM, which may be determined by the experiment.

FIGS. 3 and 4 are diagrams illustrating each of the high oil temperature valve lift switching map and the low oil temperature valve lift switching map according to the method for controlling a variable valve lift apparatus according to various embodiments of the present invention.

As illustrated in FIG. 4, when the oil temperature is a low temperature and the oil pressure is a high pressure, a control to keep the high lift mode in an area of the set first engine RPM or more is performed, in which the set first engine RPM may be determined by the experiment.

For example, when the oil temperature is 10° C. or less and the oil pressure is 5 bar or more, the switching of the variable valve lift apparatus from the high lift mode to the low lift mode is delayed or disabled, such that the operation area of the high lift mode may be kept.

In this case, since a required output of the engine is low but the operation mode of the engine 40 is the high lift mode, the injector 30 is controlled in some section to reduce the supplied fuel amount.

As illustrated in FIG. 3, when the oil temperature is a high temperature and the oil pressure is a low pressure, a control to keep the low lift mode in an area of the set second engine RPM or less is performed, in which the set second engine RPM may be determined by the experiment.

For example, when the oil temperature is 120° C. or more and the oil pressure is 1 bar or less, the viscosity of oil is relatively low and thus the switching of the variable value lift apparatus from the low lift mode to the high lift mode may be in a condition in which the switching of the low lift mode of the variable valve lift apparatus to the high lift mode thereof is disabled or delayed, such that the operation range of the low lift mode may be kept.

In this case, since the required output of the engine is high but the operation mode of the engine 40 is the low lift mode, the supplied air content may be increased, for example, the EGR valve open degree is reduced to be able to increase the supplied fresh air content.

The operation mode switching condition may further include at least any one of the atmospheric temperature, the atmospheric pressure, and the atmospheric humidity, which is included in the high oil temperature valve lift switching map and the low oil temperature valve lift switching map to be applied to the control of the variable valve lift apparatus.

For example, when the atmospheric temperature is −7° C. or less, the switching from the high lift mode to the low lift mode may be delayed or disabled and when the atmospheric temperature is 40° C. or more, the switching from the low lift mode to the high lift mode may be delayed or disabled.

Further, the atmospheric pressure and the humidity may also affect the switching between the high lift mode and the low lift mode, which may reflect the value determined by the experiment on the map.

In the above description, the maps may be defined by reflecting appropriate values of the oil temperature, the oil pressure, the atmospheric temperature, the atmospheric pressure, the atmospheric humidity, and the like by the experiment depending on a kind of used oil. Therefore, in the method for controlling a variable valve lift apparatus according to various embodiments of the present invention and the variable valve lift system, the values thereof are not limited to any specific value.

The graphs of FIGS. 3 to 7 are simply illustrated to help the convenience of understanding, but are simplified to indicate one tendency, in which it is apparent that the lift switching map applied to the method for controlling a variable valve lift apparatus and the variable valve lift system according to various embodiments of the present invention may use various forms of graphs depending on the oil temperature, the oil pressure, the atmospheric temperature, and the like.

In addition, the first engine RPM which is a reference to switch the operation mode of the variable valve lift apparatus 10 and the second engine RPM larger than the first engine RPM may have various numerical values depending on the oil temperature, the oil pressure, the atmospheric temperature, and the like, not on the specified one RPM.

According to the method for controlling a variable valve lift apparatus and the variable valve lift system according to various embodiments of the present invention, the second engine RPM has the engine RPM larger than the first engine RPM to keep the current operation mode of the variable valve lift apparatus in the mode switching delay or the switching disable condition, thereby protecting the engine and preventing the reduction in vehicle performance.

According to the method for controlling a variable valve lift apparatus and the variable valve lift system according to various embodiments of the present invention, it is possible to improve the operation limitation of the variable valve lift apparatus by controlling the variable valve lift apparatus depending on the given conditions by determining whether the variable valve lift apparatus is in a normal operation state depending on the given conditions.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a variable valve lift apparatus, comprising:
measuring an operation mode switching condition of the variable valve lift apparatus;
determining, by a controller, whether the variable valve lift apparatus is in a normal operation condition based on the measured operation mode switching condition wherein the normal operation condition is a predetermined condition in which the variable valve lift apparatus is to be operated without a mode switching delay or a switching disable condition,
wherein the mode switching delay is a condition including a predetermined oil pressure or oil temperature at which the switching of the valve variable lift apparatus from high lift mode to low lift mode or the low lift mode to the high lift mode is delayed than the switching in the normal operation condition, and wherein the mode switching disable condition is a condition including a predetermined oil pressure or oil temperature at which the switching of the valve variable lift apparatus from high lift mode to low lift mode or the low lift mode to the high lift mode is disabled;
controlling, by the controller, operation of the variable valve lift apparatus based on a predetermined normal valve lift switching map if it is determined that the variable valve lift apparatus satisfies the normal operation condition wherein the predetermined normal valve lift switching map includes a predetermined switching mode between the low lift mode and the high lift mode;
determining, by the controller, whether the variable valve lift apparatus is in the mode switching delay or the switching disable condition from the high lift mode to the low lift mode or whether the variable valve lift apparatus is in the mode switching delay or the switching disable condition from the low lift mode to the high lift mode, if it is determined that the variable valve lift apparatus does not satisfy the normal operation condition;
controlling, by the controller, the operation of the variable valve lift apparatus based on a predetermined low oil temperature valve lift switching map when the variable valve lift apparatus is in the mode switching delay or the switching disable condition from the high lift mode to the low lift mode;
controlling, by the controller, the operation of the variable valve lift apparatus depending on a predetermined high oil temperature valve lift switching map when the variable valve lift apparatus is in the mode switching delay or the switching disable condition from the low lift mode to the high lift mode;
controlling, by the controller, an air content control valve which controls an air content introduced into the engine to increase the introduced air content, when the variable valve lift apparatus is in the mode switching delay or the switching disable condition from the low lift mode to the high lift mode; and
controlling, by the controller, an injector to reduce an injected fuel amount, when the variable valve lift apparatus is in the mode switching delay or the switching disable condition from the high lift mode to the low lift mode.

2. The method of claim 1, wherein the low oil temperature valve lift switching map includes a set first engine RPM which switches the variable valve lift apparatus from the high lift mode to the low lift mode depending on the measured operation mode switching condition when a temperature of oil supplied to the variable valve lift apparatus is lower than a predetermined value.

3. The method of claim 2, wherein the high oil temperature valve lift switching map includes a set second engine RPM larger than the first engine RPM which switches the variable valve lift apparatus from the low lift mode to the high lift mode depending on the measured operation mode switching condition when the temperature of the oil supplied to the variable valve lift apparatus is equal to or higher than the predetermined value.

4. The method of claim 1, wherein the operation mode switching condition includes a set oil temperature condition and oil pressure condition.

5. The method of claim 4, wherein the oil temperature is predicted by measuring a cooling water temperature.

6. The method of claim 4, wherein the operation mode switching condition further includes at least any one of atmospheric temperature, atmospheric pressure, and atmospheric humidity.

7. A variable valve lift system, comprising:
an engine including a variable valve lift apparatus, an air content control valve controlling an introducing air content, an engine RPM sensor, and an injector;
an oil pressure sensor configured to measure an oil pressure to output a corresponding signal;
a cooling water temperature sensor configured to measure a cooling water temperature to output a corresponding signal;
a memory configured to store a normal valve lift switching map which switches an operation mode of the variable valve lift apparatus when the variable valve lift apparatus is in a normal operation condition, a low oil temperature valve lift switching map which switches the operation mode of the variable valve lift apparatus when the variable valve lift apparatus is in a mode switching delay or a switching disable condition from a high lift mode to a low lift mode, and a high oil temperature valve lift switching map which switches the operation mode of the variable valve lift apparatus when the variable valve lift apparatus is in the mode switching delay or the switching disable condition from the low lift mode to the high lift mode
wherein the normal operation condition is a predetermined condition in which the variable valve lift apparatus is to be operated without the mode switching delay or the switching disable condition,
wherein the mode switching delay is a condition including a predetermined oil pressure or oil temperature at which the switching of the valve variable lift apparatus from the high lift mode to the low lift mode or the low lift mode to the high lift mode is delayed than the switching in the normal operation condition, and wherein the mode switching disable condition is a condition including a predetermined oil pressure or oil temperature at which the switching of the valve variable lift apparatus from the high lift mode to the low lift mode or the low lift mode to the high lift mode is disabled, and
wherein the normal valve lift switching map includes a predetermined switching mode between a low lift mode and a high lift mode; and a controller configured to receive the corresponding signal from the oil pressure sensor, the cooling water temperature sensor, and a corresponding signal of the engine RPM sensor to determine a currently available valve lift switching map among the valve lift switching maps from the memory and control the operation of the variable valve lift apparatus depending on the determined corresponding valve lift switching map, wherein the controller controls the operation of the air content control valve to increase the air content introducing into the engine when the variable valve lift apparatus is controlled depending on the high oil temperature lift switching map, and wherein the controller controls the operation of the injector to reduce the fuel amount injected to the engine when the variable valve lift apparatus is controlled depending on the low oil temperature lift switching map.

\* \* \* \* \*